United States Patent
Uchida

(10) Patent No.: US 9,413,751 B2
(45) Date of Patent: Aug. 9, 2016

(54) COOPERATION SYSTEM, COOPERATION METHOD THEREOF, INFORMATION PROCESSING SYSTEM, AND STORAGE MEDIUM

(71) Applicant: CANON KABUSHIKI KAISHA, Tokyo (JP)

(72) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 13/903,416

(22) Filed: May 28, 2013

(65) Prior Publication Data

US 2013/0326608 A1  Dec. 5, 2013

(30) Foreign Application Priority Data

May 30, 2012 (JP) ................................ 2012-122910

(51) Int. Cl.
*H04L 29/06* (2006.01)
*G06F 21/41* (2013.01)

(52) U.S. Cl.
CPC ............ *H04L 63/0815* (2013.01); *G06F 21/41* (2013.01); *G06F 2221/2137* (2013.01)

(58) Field of Classification Search
CPC .... H04L 63/815; H04L 63/0815; G06F 21/41
USPC .......................................................... 726/8
See application file for complete search history.

(56) References Cited

U.S. PATENT DOCUMENTS

| 5,944,824 A * | 8/1999 | He ........................ G06F 21/33 726/6 |
| 8,707,409 B2 * | 4/2014 | Shah ...................... G06F 21/41 726/8 |
| 2001/0049787 A1 * | 12/2001 | Morikawa et al. ............ 713/156 |
| 2002/0144119 A1 * | 10/2002 | Benantar ................ G06F 21/33 713/171 |
| 2003/0120593 A1 * | 6/2003 | Bansal et al. .................... 705/39 |
| 2003/0120738 A1 * | 6/2003 | Chin et al. ..................... 709/208 |
| 2004/0039909 A1 * | 2/2004 | Cheng ............................ 713/169 |
| 2005/0097332 A1 * | 5/2005 | Imai ............................... 713/176 |
| 2006/0109839 A1 * | 5/2006 | Hino et al. ..................... 370/352 |
| 2006/0156385 A1 * | 7/2006 | Chiviendacz et al. ............ 726/2 |
| 2006/0158676 A1 * | 7/2006 | Hamada .............. G06F 21/6218 358/1.14 |
| 2006/0236382 A1 * | 10/2006 | Hinton et al. ..................... 726/8 |
| 2006/0236384 A1 * | 10/2006 | Lindholm et al. ............... 726/10 |
| 2007/0240206 A1 * | 10/2007 | Wu et al. ........................... 726/8 |
| 2008/0010665 A1 * | 1/2008 | Hinton .................... G06F 21/41 726/1 |

(Continued)

FOREIGN PATENT DOCUMENTS

JP        2011-221729 A    11/2011

*Primary Examiner* — Hadi Armouche
*Assistant Examiner* — Shahriar Zarrineh
(74) *Attorney, Agent, or Firm* — Canon U.S.A., Inc. IP Division

(57) ABSTRACT

A client sends a request to start to use a service via an information processing system that is a cooperation source, acquires identification information indicating that authentication has been successfully performed based on group authentication information set for a group to which a user belongs, and then transmits the identification information to an information processing system that is a cooperation destination.

6 Claims, 14 Drawing Sheets

(56) References Cited

U.S. PATENT DOCUMENTS

| | | | |
|---|---|---|---|
| 2009/0007248 A1* | 1/2009 | Kovaleski | G06F 21/33 726/8 |
| 2009/0109479 A1* | 4/2009 | Kato | 358/1.15 |
| 2009/0158425 A1* | 6/2009 | Chan et al. | 726/21 |
| 2009/0199277 A1* | 8/2009 | Norman | H04L 63/105 726/5 |
| 2011/0022837 A1* | 1/2011 | Stevens | H04L 63/0823 713/155 |
| 2011/0072512 A1* | 3/2011 | Je et al. | 726/21 |
| 2011/0099618 A1* | 4/2011 | Mutt | 726/8 |
| 2011/0154443 A1* | 6/2011 | Thakur | G06F 21/41 726/3 |
| 2011/0225426 A1* | 9/2011 | Agarwal | G06F 21/41 713/175 |
| 2011/0231919 A1* | 9/2011 | Vangpat | H04L 63/0815 726/8 |
| 2011/0295646 A1* | 12/2011 | Barros | 705/7.26 |
| 2011/0321145 A1* | 12/2011 | Shimotono | 726/7 |
| 2012/0036015 A1* | 2/2012 | Sheikh | G06Q 30/02 705/14.54 |
| 2012/0210413 A1* | 8/2012 | Akula | H04L 63/0815 726/8 |
| 2013/0174243 A1* | 7/2013 | Inatomi et al. | 726/7 |
| 2013/0291071 A1* | 10/2013 | Blom et al. | 726/4 |
| 2013/0335770 A1* | 12/2013 | Yasukawa | 358/1.14 |
| 2014/0108792 A1* | 4/2014 | Borzycki et al. | 713/165 |
| 2014/0165150 A1* | 6/2014 | Brunswig et al. | 726/4 |
| 2014/0189796 A1* | 7/2014 | Mashimo | G06F 21/305 726/3 |

* cited by examiner

FIG. 5

| UNPROTECTED URL |
|---|
| images/* |
| js/* |
| css/* |
| unprotected/* |
| ⋮ |

FIG. 9

| | BUTTON SETTING | |
|---|---|---|
| 901 | DISPLAY NAME | DOCUMENT GENERATION |
| 902 | ACTION | EXECUTE JAVASCRIPT |
| 903 | CONTENT | ```
var mainForm = document.createElement("form");
mainForm.action = url;
mainForm.method = "GET";
document.body.appendChild(mainForm);

var authsession = <ACQUIRE Cookie "LOGIN">;
var url;
if(authsession == null) {
authsession = <ACQUIRE AUTHENTICATION INFORMATION>;
url = "http://service_a/unprotected/service";
var authid = document.createElement("input");
authid.name = "AUTH_ID";
authid.value = authsession;
mainForm.appendChild(authid);
} else {
url = "http://service_a/service";
}

<STORE AUTHENTICATION IN Cookie "LOGIN"> var sid = document.createElement("input");
sid.name = "sessionid";
sid.value = "{!$Api.Session_ID}";
mainForm.appendChild(sid);

var url = document.createElement("input");
url.name = "serverurl";
url.value = "{!$Api.Server_URL}";
mainForm.appendChild(url);

var rid = document.createElement("input");
rid.name = "recordid";
rid.value = "{!Opportunity.Id}";
mainForm.appendChild(rid);
} var sub = window.open("about:blank", "serviceA");
mainForm.submit();
}
``` |

FIG. 14

| BUTTON SETTING | |
|---|---|
| DISPLAY NAME | DOCUMENT GENERATION |
| ACTION | EXECUTE JAVASCRIPT |
| CONTENT | ```
var mainForm = document.createElement("form");
mainForm.action = "http://service_a/service";
mainForm.method = "GET";
document.body.appendChild(mainForm);

var tenantid =<ACQUIRE COMPANY ID> if (tenantid=="") {
var init = document.createElement("input");
init.name = "init";
init.value = "true";
mainForm.appendChild(init);
}
var tid = document.createElement("input");
tid.name = "TENANT_ID]";
tid.value = tenantid;
mainForm.appendChild(tid);

var sid = document.createElement("input");
sid.name = "sessionid";
sid.value = "{!$Api.Session_ID}";
mainForm.appendChild(sid);

var url = document.createElement("input");
url.name = "serverurl";
url.value = "{!$Api.Server_URL}";
mainForm.appendChild(url);

var rid = document.createElement("input");
rid.name = "recordid";
rid.value = "{!Opportunity.Id}";
mainForm.appendChild(rid);
} var sub = window.open("about:blank","serviceA");
mainForm.submit();
}
``` |

901 — DISPLAY NAME
902 — ACTION
1403 — CONTENT

COOPERATION SYSTEM, COOPERATION METHOD THEREOF, INFORMATION PROCESSING SYSTEM, AND STORAGE MEDIUM

BACKGROUND OF THE INVENTION

1. Field of the Invention

The present invention relates to a cooperation system for causing a plurality of information processing systems to cooperate with one another by single sign-on, a cooperation method thereof, an information processing system therein, and a storage medium.

2. Description of the Related Art

Configurations for managing operation data and performing various types of processing operations on a cloud platform have been gaining popularity. A user accesses a web page provided by the cloud platform from a browser of a client personal computer (PC) via the Internet, and displays the operation data to be viewed on the web page. For example, when the user gives a document generation instruction via a screen of the PC, the client PC accesses a document generation server. Subsequently, the document generation server acquires the operation data on the cloud platform, generates the document, and then transmits the generated document to the client PC. A typical example of the cloud platform includes Salesforce CRM (registered trademark) of Salesforce.com.

The cloud platform and the document generation server are operated in a multi-tenant manner. The tenant refers to a unit of companies or organizations that are under contract for using the cloud platform and the document generation server, and a group to which the user belongs. In a service operated in a multi-tenant manner, one information processing system manages data of a plurality of tenants and separately manages the data of each tenant so that the data of the tenant cannot be referred to from another tenant. To make the tenant refer to only its own data, the cloud platform and the document generation server authenticate the user and check the tenant. The user is authenticated using a user identification (ID) for identifying the user and a password, which is confidential information, and the tenant is checked on whether the tenant input by the user exists.

When the cloud platform and the document generation server cooperate with each other, the user does not need to be authenticated by each server but the authentication can be made to cooperate with one another among the information processing systems. Conventionally, techniques for making the authentication cooperate with one another among a plurality of information processing systems include a single sign-on (SSO) structure by a security assertion markup language (SAML). In the SSO by the SAML, the user retains both user IDs of the information processing system (an identity provider (IdP)) providing an authentication service and an information processing system (a service provider (SP)) providing a service with an authentication result of the IdP relied. When the user receives the user authentication by the IdP, the SP relies on the authentication result and authenticates user's access as the user ID managed in the SP (IdP preceding). Further, when the user who has not been authenticated yet by the IdP accesses the SP, the SP guides the unauthenticated user to an appropriate IdP and makes the user authenticated by the IdP (SP preceding). By any method, the user can receive the service provided by the SP only by inputting the user authentication information in the IdP, and reduce the user authentication processing in the SP, thereby improving convenience.

When the SSO is performed by the SAML, the user ID retained by the IdP and the user ID retained by the SP are associated with each other (hereinafter referred to as "user mapping") to be managed. Particularly, when the service always requiring identifying the user is associated with the document generation server, the ID needs to be managed by the user mapping. A printing service for managing and printing the document for each user always requires identifying the user.

Further, a method for associating the IDs retained by each of the plurality of information processing systems with one another has been conventionally known. Japanese Patent Application Laid-Open No. 2011-221729 discusses a method in which the service providing server guides the user to access the authentication server, registers the authentication information between the authentication server and the user to perform the authentication processing.

However, the conventional method has problems as described below. In order for a plurality of information processing systems to perform the SSO, the user mapping is essential for associating a plurality of user IDs in the information processing system of a cooperation source and a plurality of user IDs in the information processing system of a cooperation destination.

The user takes much work on the user mapping. When the number of user IDs increases, the user's work increases accordingly.

SUMMARY OF THE INVENTION

The present invention is directed to a cooperation system in which group authentication information is set for a group to which a plurality of users belongs and, using the group authentication information, SSO is realized to reduce work of user mapping.

According to an aspect of the present invention, a cooperation system includes a first information processing system for managing user authentication information about a plurality of users for each group and a second information processing system for acquiring data from the first information processing system and providing a service using the acquired data. The first information processing system includes a first authentication unit configured to receive user authentication information from a user operating a client and to authenticate the user based on the received user authentication information, and a first transmission unit configured to, in response to reception of a request for starting to use the service after the user is successfully authenticated, transmit group authentication information set for the group to which the user belongs to the second information processing system, and the second information processing system includes a second authentication unit configured to receive the transmitted group authentication information and to perform authentication based on the received group authentication information, and a second transmission unit configured to, after the authentication has been successfully performed based on the group authentication information, transmit identification information indicating that the authentication has been successfully performed to the first information processing system, wherein the first information processing system further includes an instruction unit configured to transmit the transmitted identification information to the client and to instruct the client to access the second information processing system, and wherein the second information processing system further includes a verification unit configured to verify the identification information transmitted from the client performing access according to the instruction, and a providing unit configured to, in response to successful verification of the identification information, provide the service to the user operating the client without authenticating the user operating the client.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates information managed by an unprotected resource management module according to the first exemplary embodiment of the present invention.

FIG. 9 illustrates an example of button setting according to the first exemplary embodiment of the present invention.

FIG. 14 illustrates an example of button setting according to a third exemplary embodiment of the present invention.

DESCRIPTION OF THE EMBODIMENTS

Various exemplary embodiments, features, and aspects of the invention will be described in detail below with reference to the drawings.

The present invention is directed to realizing SSO by setting group authentication information for a group to which a plurality of users belongs and using the group authentication information.

More specifically, an information processing system of a cooperation source for managing user authentication information corresponding to each of a plurality of users for each group receives a user's request for starting to use a service of the information processing system of the cooperation destination. In response to the user's request, the information processing system of the cooperation source transmits group authentication information set for the group to which the plurality of users belongs to the information processing system of the cooperation destination and receives the authentication. The information processing system of the cooperation destination transmits the identification information indicating that the authentication has been successfully performed to the information processing system of the cooperation source. The identification information is transmitted from the information processing system of the cooperation source to a client operated by the user requesting for starting to use the service. The information processing system of the cooperation destination verifies the identification information transmitted from the client and then, according to the verification of correct identification information, provides the service without authenticating the user operating the client.

In the conventional technique, user mapping needs to be performed between the user ID in the information processing system of the cooperation source and the user ID in the information processing system of the cooperation destination. However, according to the present invention, SSO can be realized using the group authentication information shared among all users belonging to the group. As a result, the user does not need to perform the user mapping but may only set the group authentication information for the group to which the plurality of users belongs, thereby greatly reducing troublesome processing.

Figure 1:
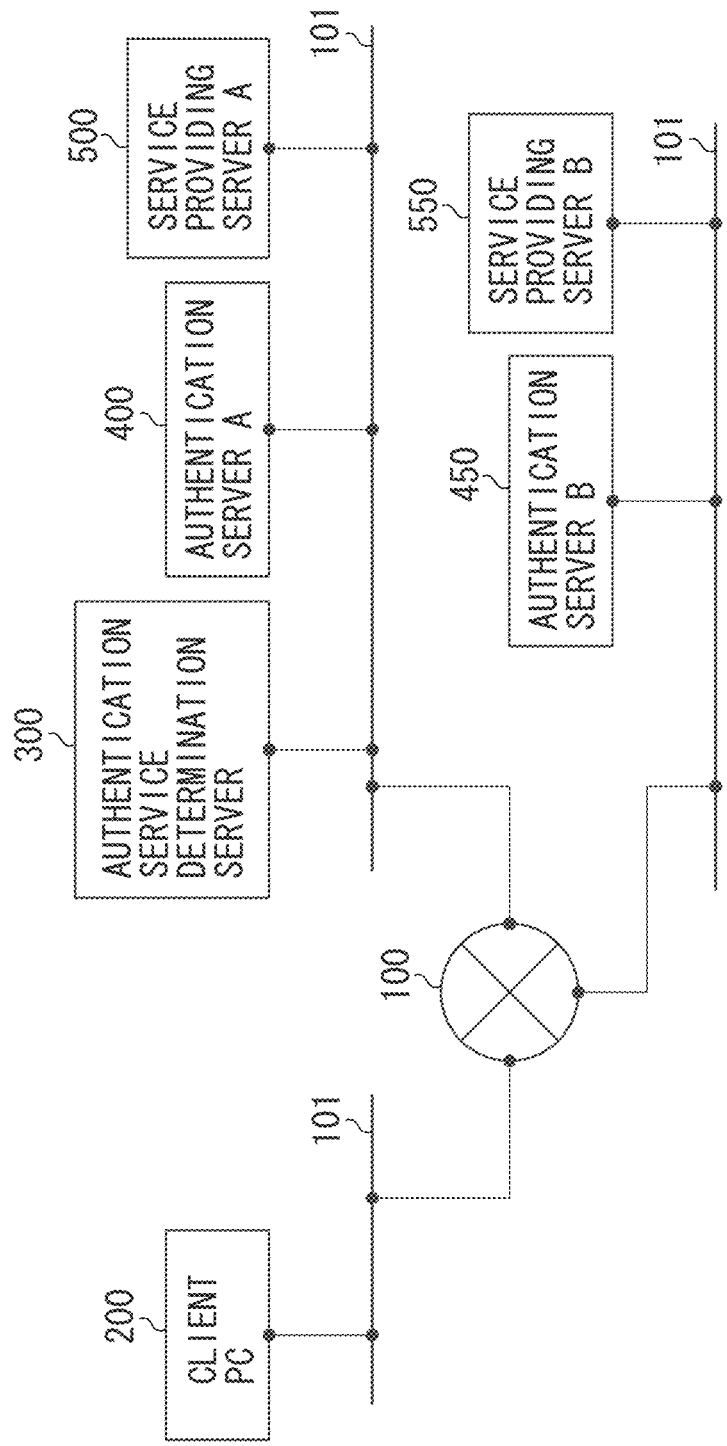
FIG. 1 illustrates a system configuration according to a first exemplary embodiment of the present invention.

FIG. 1 is a block diagram illustrating a system configuration of a cooperation system according to a first exemplary embodiment.

According to the present exemplary embodiment, a wide area network (WAN) 100 is established by a World Wide Web (WWW) system. A local area network (LAN) 101 connects configuration elements with one another. The LAN 101 via the WAN 100 enables the apparatuses to communicate with one another.

A client PC 200 is an information processing apparatus operated by the user. According to a user's request, the client PC 200 issues a request for a service providing server A 500 and a service providing server B 550 described below and transmits it to them.

An authentication service determination server 300 guides the client PC 200 to access an appropriate IdP. An authentication server A 400 and an authentication server B 450 perform authentication and act as the authentication device in the IdP. The authentication service is not limited to the two described above. Which IdP actually authenticates the user varies depending on the user that accesses.

The service providing server A 500 and the service providing server B 550 provide the service for the authenticated user. The service providing server A 500 receives the request from the client PC 200, and then provides the document generation service for generating document data. Original data required when the document data is generated is acquired from the service providing server B 550, for example. The service providing server B 550 provides the service for displaying and updating the data retained according to the request from the client PC 200 or the service providing server A 500. The service providing server A 500 and the service providing server B 550 are not limited to the document generation service and the cloud platform, but may be other services.

Further, the client PC 200, the authentication service determination server 300, the authentication server A 400, the authentication server B 450, the service providing server A 500, and the service providing server B 550 are connected with one another via the WAN 100 or the LAN 101. The information processing apparatuses described above can communicate with one another. The client PC 200 and each server may be formed on the individual LAN and also may be formed on the same LAN. They may be formed in the same PC too.

The authentication server B 450 and the service providing server B 550 are established as a server group in the same network (in an intranet), and the authentication service determination server 300, the authentication server A 400, and the service providing server A 500 are established as a server group in the same network (in the intranet). The former server group is referred to as a "first information processing system", and the latter server group is referred to as a "second information processing system". The server forming each information processing system is not limited to the server discussed in the first exemplary embodiment. A server providing other services may exist.

Subsequently, a case will be described where the user is identified by the user authentication and the user receives the service when the user is successfully identified. This is performed by the cooperation via the SSO by the SAML that performs the user mapping.

The client PC 200 accesses the service providing server B 550. When the service providing server B 550 receives access of the unauthenticated user, it displays the authentication screen (not illustrated) to authenticate the user. When the user is successfully authenticated, operation data is displayed.

Figure 6:
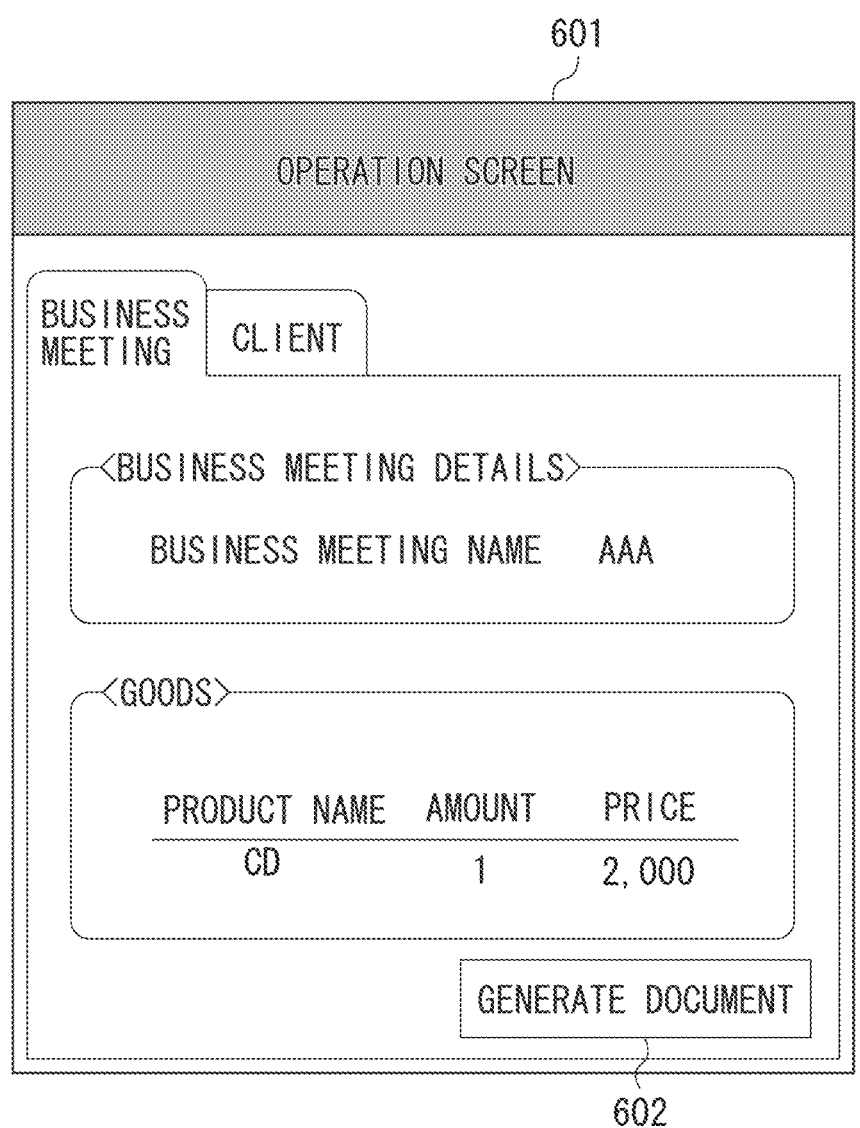
FIG. 6 illustrates a screen for operation data of the service providing server B according to the first exemplary embodiment of the present invention.

FIG. 6 illustrates an example of a screen 601 for the operation data displayed by the service providing server B 550 according to the first exemplary embodiment. The screen 601 for the operation data includes tabs such as "business meeting" and "client". The tab of "business meeting" is displayed active, and detailed information about a business meeting record and goods are displayed. Further, a button 602 for which the access to the service providing server A 500 is set is displayed. An action when the button 602 is pressed can be arbitrarily set by the user, a manager of a tenant, for example. When the button 602 is pressed, the client PC 200 accesses the service providing server A 500.

When the service providing server A 500 receives the access of the unauthenticated user, the service providing server A 500 causes the client PC 200 to access the authentication service determination server 300. The authentication service determination server 300 causes the client PC 200 to access the appropriate authentication server A 400 or authentication server B 450. When the authentication server A 400 or the authentication server B 450 authenticates the user, the authentication server A 400 or the authentication server B 450 causes the client PC 200 to access the service providing server A 500 again. The service providing server A 500 provides the user operating the client PC 200 with the service.

The authentication service determination server 300 stores information serving as a key for determining the authentication server for authenticating the user, which is tenant information for identifying the tenant for example, and the authentication server information with the information associated with each other. When the authentication service determination server 300 receives the access of the unauthenticated user, the authentication service determination server 300 retrieves the information serving as the key for determining the authentication server from the information provided when the user accesses the authentication service determination server 300, and then acquires the authentication server information. Subsequently, the authentication service determination server 300 guides the user to access the appropriate authentication service according to the retrieved authentication server information.

When the authentication server A 400 receives the unauthenticated access re-directed from the authentication service determination server 300, the authentication server A 400 displays a user authentication screen (not illustrated), and prompts the user to input the user ID and the password to authenticate the user. When the authentication server A 400 has received access destination information after the authentication has been completed, based on the information, the user's access is re-directed. For example, when the service providing server A 500 has been specified as a re-direct destination after the authentication has completed, the client PC 200 is re-directed to access the service providing server A 500. At this point, as information indicating that the user has been authenticated, assertion is issued, and then the client PC 200 is re-directed to access the service providing server A 500 with the assertion added. The service providing server A 500 requests the authentication server A 400 to verify the assertion. The authentication server A 400 verifies whether the assertion is correct, and when it is verified that the assertion is correct, the authentication server A 400 specifies the user ID managed thereby in response to the verification of the correct assertion. The specified user ID is previously associated with the user ID in the authentication server B 450 by the user mapping.

The authentication server A 400 issues an authentication session ID indicating that the access is from the authentic user. The authentication session ID includes an arbitrary, unique character string, and the authentication server A 400 stores the user ID and the authentication session ID with the IDs associated with each other. Subsequently, the authentication server A 400 specifies the user ID based on the authentication session ID provided when the user accesses the authentication server A 400. The authentication session ID is added to a response page returned to a browser of the client PC 200 by the service providing server A 500, and stored in the browser thereof. Subsequently, when the user accesses the service providing server A 500 via the browser of the client PC 200, the authentication session ID is transmitted to the service providing server A 500. The authentication session ID is valid for a predetermined time, and an expiration time is managed by the authentication server A 400. According to the first exemplary embodiment, the expiration time (idling time) of the authentication session ID is set to 30 minutes. The authentication session ID is transmitted to the service providing server A 500 so that the user can receive the service provided by the service providing server A 500 without being authenticated by the authentication server A 400. As described above, the single sign-on has an advantage in which the user does not need to input the user authentication information.

When the service providing server A 500 receives the access re-directed from the authentication server A 400, since the user has been already authenticated, the user can receive the service provided by the service providing server A 500. According to the first exemplary embodiment, the authentication session ID may be added to an item of Cookie "AUTH_SESSION_ID" stored by the client. The authentication session ID can be added by a method other than Cookie.

Further, the authentication server A 400 includes an application programming interface (API) for authenticating the user when receiving the user ID and the password. The user authentication API is an interface for returning the authentication session ID to the invoker when it authenticates the user. Furthermore, the authentication server A 400 includes the API for receiving the assertion and the authentication session ID to verify adequateness of each data. The API for verifying the adequateness of the authentication session returns the verification result to the invoker.

When the authentication server B 450 receives the unauthenticated access re-directed from the authentication service determination server 300, it displays the user authentication screen (not illustrated), and prompts the user to input the user ID and the password to authenticate the user. In other words, the authentication server B 450 also includes the API for authenticating the user. When the authentication server B 450 successfully authenticates the user, it generates an evidence for the success and the assertion, and then re-directs the client PC 200 to access the authentication service that can verify the assertion.

As described above, the user is identified by the user authentication, and then the user receives the service provided depending on the identification. The cooperation system according to the first exemplary embodiment can perform the SSO, and how the SSO is performed will be described in detail below in another exemplary embodiment.

Figure 2:
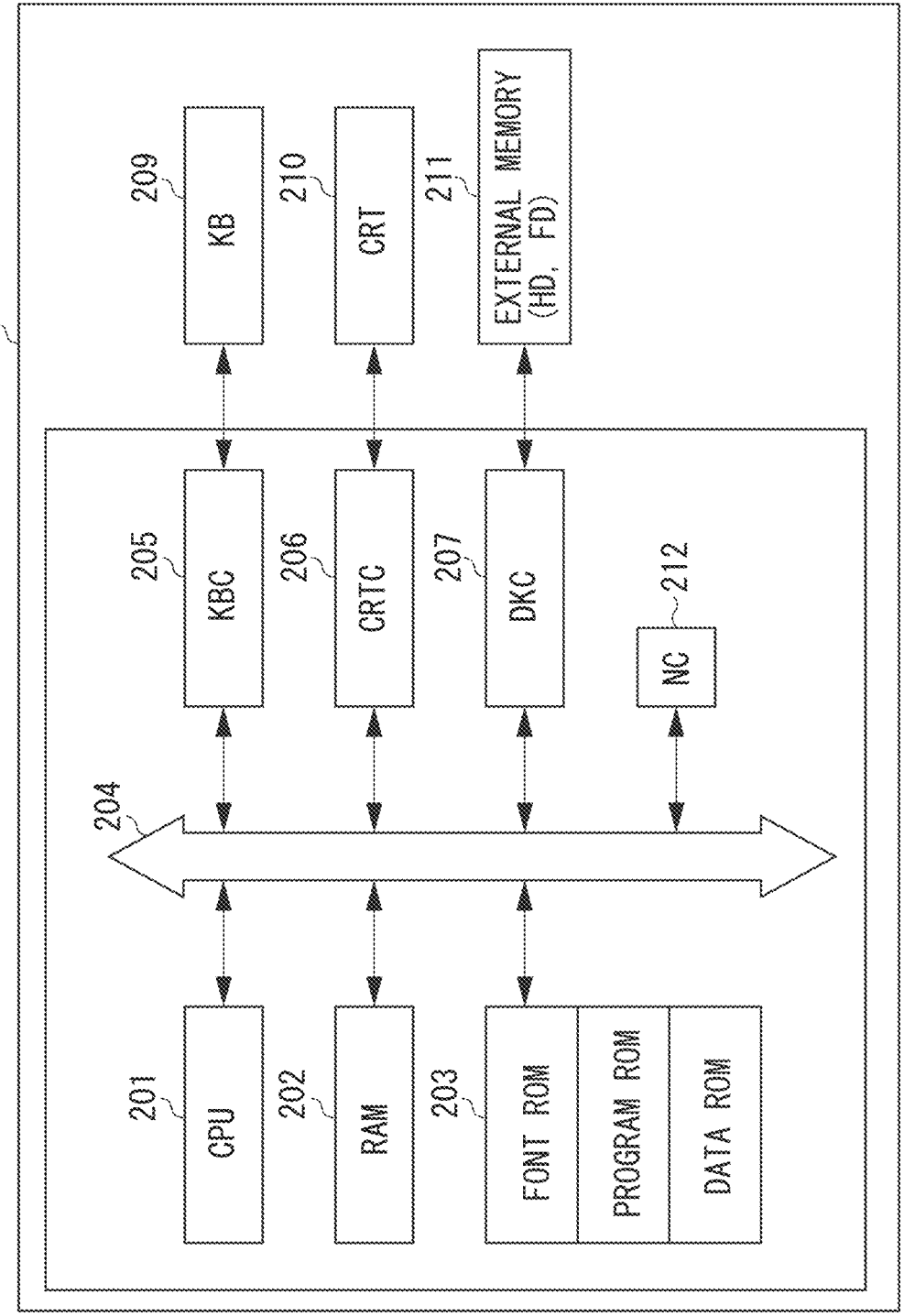
FIG. 2 illustrates a hardware configuration according to the first exemplary embodiment of the present invention.

FIG. 2 illustrates a configuration of the client PC 200 according to the first exemplary embodiment. Further, a server computer providing the authentication service determination server 300, the authentication server A 400, the authentication server B 450, the service providing server A 500, and the service providing server B 550 has a similar configuration. As described above, a hardware configuration of a general information processing apparatus can be applied to the client PC 200 and each server according to the first exemplary embodiment.

As illustrated in FIG. 2, a central processing unit (CPU) 201 executes a program such as an operating system (OS) and an application stored in a program read only memory (ROM) of a ROM 203 or loaded into a random access memory (RAM) 202 from a hard disk (HDD) 211. The "OS" herein is an abbreviation of an operating system running on a computer and referred to as the "OS" hereinafter. The program for realizing processing of each flowchart described below is performed on the OS. The RAM 202 functions as a main memory and a work area for the CPU 201. A keyboard controller (KBC) 205 controls a keyboard (KB) 209 and a key input via a pointing device (not illustrated). A cathode ray tube (CRT) controller (CRTC) 206 controls display of a CRT display 210. A disk controller (DKC) 207 controls data access to a hard disk (HD) 211 and a floppy disk (FD) that store various types of data. A network controller (NC) 212 is connected to a network to perform communication control processing with other devices connected thereto. In the all description below, a main subject on the hardware is the CPU 201 unless otherwise specified, and a main subject on software is each software module installed in the HD 211.

Figure 3:
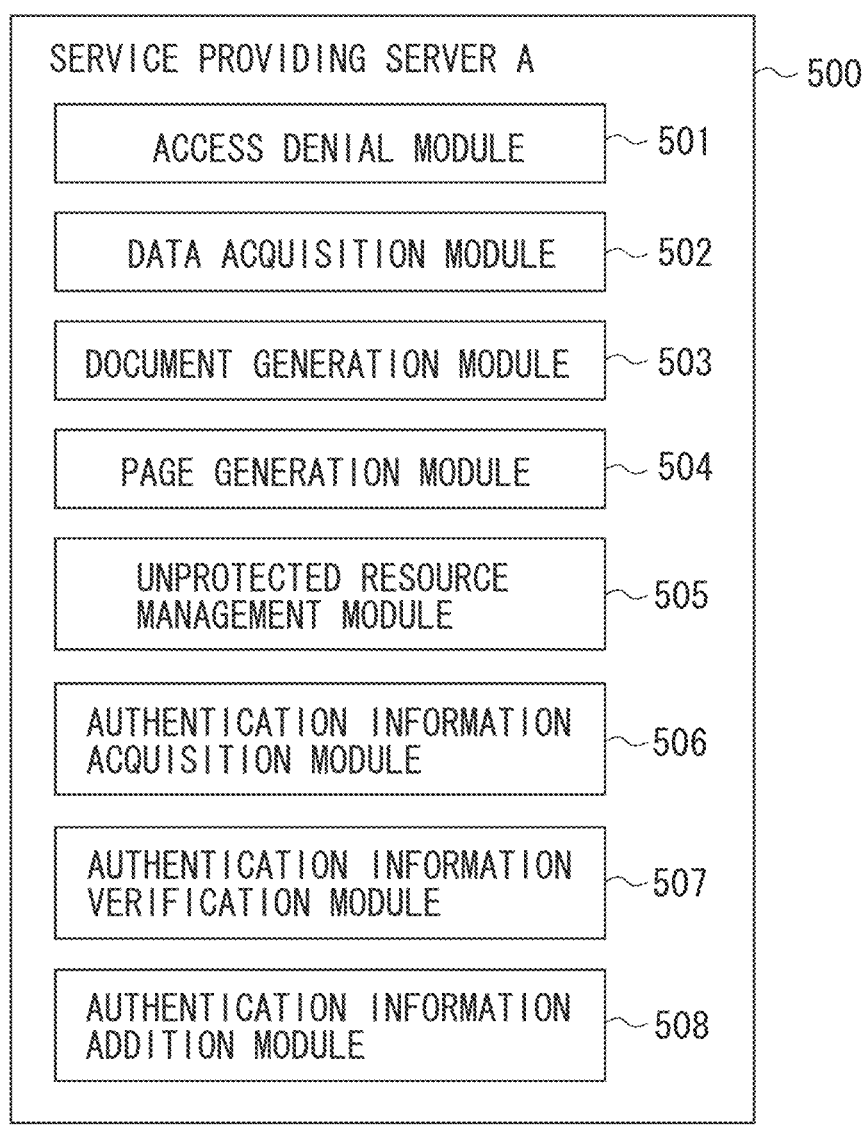
FIG. 3 illustrates a module configuration of a service providing server A according to the first exemplary embodiment of the present invention.

FIG. 3 illustrates a software module configuration of the service providing server A 500 according to the first exemplary embodiment. The service providing server A 500 includes an access denial module 501, a data acquisition module 502, a document generation module 503, a page generation module 504, an unprotected resource management module 505, an authentication information acquisition module 506, an authentication information verification module 507, and an authentication information addition module 508. The modules described above can be realized when each software module stored in the HDD 211 of the service providing server A 500 is loaded into the RAM 202 and executed by the CPU 201.

When the service providing server A 500 receives the access from the client PC 200, the access denial module 501 determines whether a uniform resource locator (URL) accessed is registered to the unprotected resource management module 505.

FIG. 5 illustrates an example of the URL registered to the unprotected resource management module 505 (hereinafter referred to as a "unprotected resource"). As illustrated in FIG. 5, an image file, a javascript (registered trademark) file, a cascading style sheets (CSS) file, and the URL beginning with "http://service_a/unprotected/" are registered as the unprotected resource. When the client PC 200 accesses the URL that is not registered to the unprotected resource management module 505 (hereinafter referred to as a "protected resource), the processing described above is performed. In other words, when the user is unauthenticated (the request does not include Cookie "AUTH_SESSION_ID" or the added authentication session ID is not valid), the service providing server A 500 displays the user authentication screen. When the URL beginning with "http://service_a/unprotected/", which is the unprotected resource, is accessed, the user authentication screen is not displayed and whether the authentication session ID is correct is verified. The details will be described below. When the authentication session ID included in the access from an external device is correct, the service providing server A 500 provides the service, and when it is not correct, an error is returned.

When the URL accessed is the unprotected resource, the access denial module 501 verifies the authentication session ID and, when the authentication session ID is correct, the access denial module 501 instructs the client PC 200 to access the protected resource, and then provides the user operating the client PC 200 with the service. Further, when the URL is the protected resource, the access denial module 501 determines whether the user's access has been authenticated, and the unauthenticated client PC 200 is re-directed to access the authentication service determination server 300. When the user's access has been authenticated, the document generation module 503 described below transmits the generated document to the client PC 200 to provide the user operating the client PC 200 with the service.

The access denial module 501 determines whether the user operating the client PC 200 has been authenticated based on whether the request includes Cookie "AUTH_SESSION_ID" and whether the authentication session ID included in Cookie "AUTH_SESSION_ID" is valid.

The data acquisition module 502 acquires the operation data from the service providing server B 550. The document generation module 503 acquires a form managed by a form management module (not illustrated) and inserts the operation data acquired by the data acquisition module 502 into the form to generate the document data. The document data is to be record file data such as general residence certificate and account files, however may be other data. In response to the request from the client PC 200, the page generation module 504 generates the response page and returns it to the client PC 200. The response page is a screen (not illustrated) for, for example, inputting the user authentication information (not illustrated) and displaying the document data.

When the service providing server B 550 accesses the URL, which is the unprotected resource for acquiring the authentication session ID, the access denial module 501 retrieves a group ID and the password from the request. The authentication information acquisition module 506 specifies the retrieved group ID and password to invoke the user authentication API of the authentication server A 400. When the client PC 200 accesses the URL that is the unprotected resource for verifying the authentication session ID, the access denial module 501 retrieve the authentication session ID from a parameter portion of the URL. The authentication information verification module 507 specifies the retrieved authentication session ID to invoke an authentication session adequateness verification API of the authentication server A 400. As described above, the function is provided by the software module of the service providing server A 500.

Figure 4:
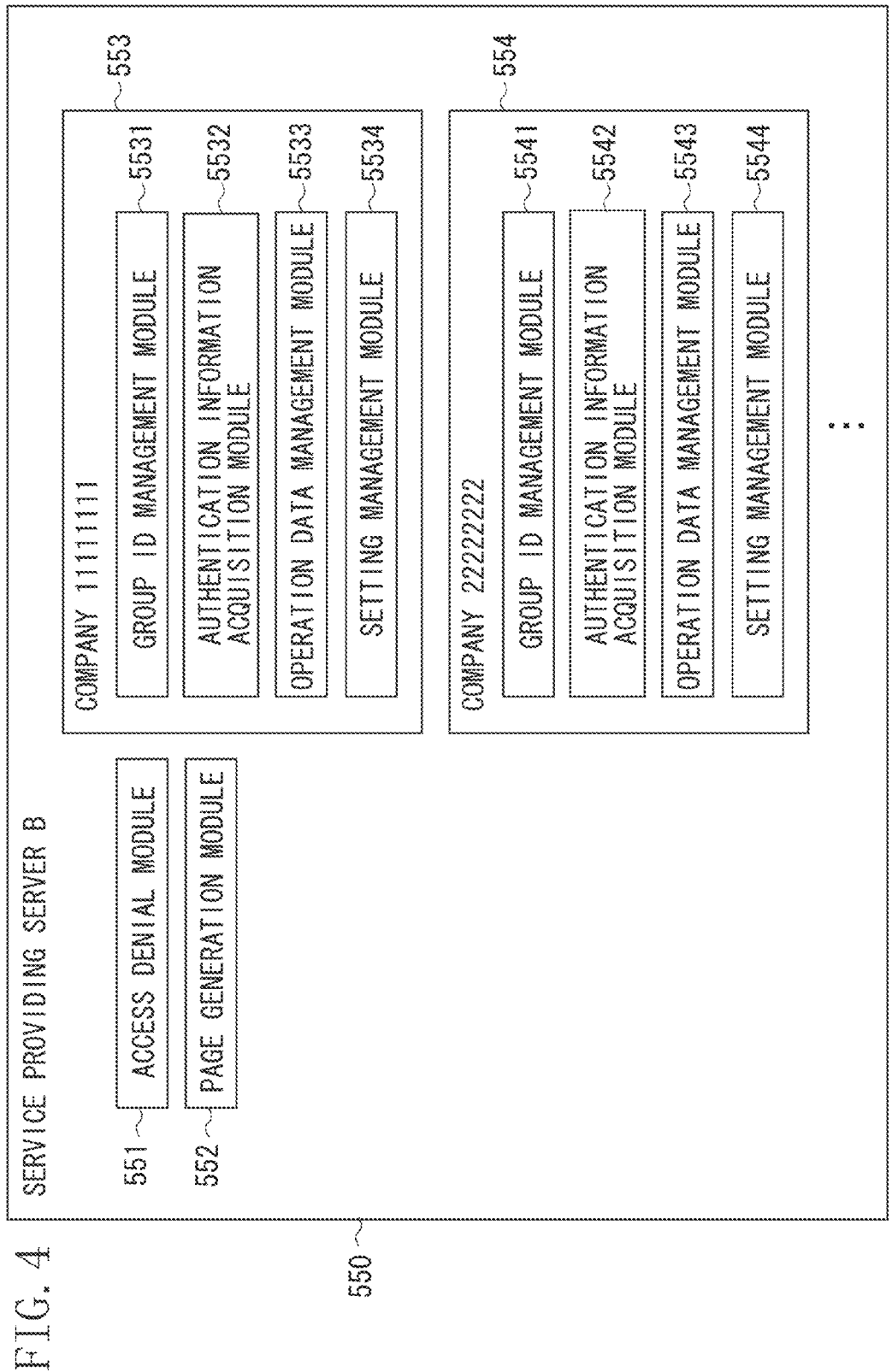
FIG. 4 illustrates a module configuration of a service providing server B according to the first exemplary embodiment of the present invention.

FIG. 4 illustrates a module configuration of the service providing server B 550 according to the present exemplary embodiment. The service providing server B 550 includes an access denial module 551, group ID management modules 5531 and 5541, authentication information acquisition modules 5532 and 5542, operation data management modules 5533 and 5543, and setting management modules 5534 and 5544. The modules described above can be realized when each software module stored in the HDD 211 of the service providing server B 550 is loaded into the RAM 202 and executed by the CPU 201.

When the service providing server B 550 receives the access from the client PC 200, the access denial module 551 determines whether the user has been authenticated, and when the user has not be authenticated yet, the page generation module 552 displays the user authentication screen. When the user has been authenticated, the service providing server B 550 provides the service. When the service providing server B 550 receives the request for displaying the operation data, the operation data management module 5533 or 5543 acquires the operation data. When the screen for displaying the operation data includes the button, the setting management module 5534 or 5544 acquires the button setting. The page generation module 552 generates the response page, and then returns it to the client PC 200. Detailed description of the button setting according to the first exemplary embodiment will be described below.

The user ID and password managed by the group ID management module 5531 or 5541 are account information for identifying the tenant accessing the service providing server A 500 and include the group ID and password. The group ID management module 5531 or 5541 manages maximum one pair of group ID and password. The group ID and password are previously issued and acquired by a certain method by the user (manager), and then registered via a setting screen (not illustrated).

From a point of view of security, it is desirable that the group ID and password of the group ID management module 5531 or 5541 be registered and updated only via an ID setting screen (not illustrated). Further, it is desirable that the password managed by the group ID management module 5531 or 5541 be not displayed on the ID setting screen (not illustrated). Furthermore, it is desirable that the group ID and password managed by the group ID management module 5531 or 5541 be able to be acquired only from the authentication information acquisition module 5532 or 5542. The group ID and password managed by the group ID management module 5531 or 5541 should not be able to be acquired and referred to from an outside of the service providing server B 550.

The group authentication information refers to the group ID and password described above. According to the first exemplary embodiment, one piece of group authentication information is allocated to one tenant. As a result, all users belonging to the specified tenant share the group authentication information. The group authentication information is not limited to the group ID and password. The group authentication information may have any format as long as it is uniquely allocated to one tenant and its data can be used via the user authentication API of the authentication server A 400. For a group further divided from one tenant, the present invention can be applied.

When the service providing server B 550 receives the request for acquiring the authentication session ID from the client PC 200, the authentication information acquisition module 5532 or 5542 acquires the group ID and password from the group ID management module 5531 or 5541. The authentication information acquisition module 5532 or 5542 sets the acquired group ID and password to the parameter and accesses the URL of the unprotected resource for acquiring the authentication session ID of the service providing server A 500. The authentication information acquisition module 5532 or 5542 is publicized as the web service API, for example, to receive an authentication session ID acquisition request from the browser of the client PC 200.

Further, the group ID management module 5531 or 5541, the authentication information acquisition module 5532 or 5542, the operation data management module 5533 or 5543, and the setting management module 5534 or 5544 are managed for each tenant. For the management, the modules managed for each tenant maybe stored into the same HDD 211 and the data for each tenant may be logically separated, or the HDD 211 may be separated to physically, separately manage the module.

FIG. 9 illustrates an example of the button setting of the button 602 according to the first exemplary embodiment, and the button 602 is disposed on the screen 601 for the operation data. A display name 901 of the button 602 is set as "document generation", and, as an action 902 when the button 602 is pressed, it is defined that the JavaScript (registered trademark) is performed on the browser of the client PC 200. Further, as the setting of the button 602, the content 903 of the JavaScript (registered trademark) to be performed is defined. As illustrated in FIG. 9, a portion defined to acquire the authentication information acquires the authentication session ID in the service providing server B 550 from the authentication information acquisition module 5532 or 5542. As a method for acquiring the authentication session ID, for example, a method in which the authentication information acquisition module 5532 or 5542 publicizes the web service API and invokes it can be used.

As illustrated in FIG. 9, the portion defined to acquire or store Cookie "LOGIN" indicates to perform processing for transmitting Cookie "LOGIN" from the browser of the client PC 200 to the service providing server A 500 to be acquired, or for storing Cookie "LOGIN" into the browser thereof. Cookie is temporarily stored in the server as the data by the client. The data about a communication and authentication state between the information processing system and the client is stored in the HDD 211 of the client PC as Cookie.

The expiration time for Cookie can be set when it is stored, and when the expiration time elapses, Cookie can be deleted by the browser of the client PC 200. Cookie "LOGIN" is a flag for determining whether the service providing server B 550 acquires the authentication session ID from the service providing server A 500 using the group authentication information. When Cookie "LOGIN" does not exist, or when the client PC 200 determines that the expiration time set when Cookie "LOGIN" has been once stored has elapsed, the service providing server B 550 acquires the authentication session ID of the service providing server A 500. The browser of the client PC 200 sets the acquired authentication session ID to the parameter of the URL of the unprotected resource and accesses a document generation processing URL of the unprotected resource of the service providing server A 500. When Cookie "LOGIN" is within the expiration time, the browser of the client PC 200 accesses the document generation processing URL of the protected resource of the service providing server A 500.

The expiration time of Cookie "LOGIN" according to the first exemplary embodiment is set shorter than the expiration time (idling time) of the authentication session ID managed by the authentication server A 400. Thus, when Cookie "LOGIN" is within the expiration time, the authentication session ID included in Cookie "AUTH_SESSION_ID" is always valid. Therefore, even though the client PC 200 accesses the URL of the protected resource, the authentication screen for inputting the user authentication information required for authenticating the user is not displayed. Cookie "AUTH_SESSION_ID" is used for the authentication when the client PC 200 accesses the document generation processing URL of the protected resource, and is different from Cookie "LOGIN". The user operating the client PC 200 with Cookie "AUTH_SESSION_ID" can receive the service without being authenticated by the service providing server A 500. Cookie "LOGIN" is provided and the expiration time thereof is set shorter than that of Cookie "AUTH_SESSION_ID" so that the user is never authenticated by the service providing server A 500 when the client PC 200 accesses the service providing server A 500. Therefore, user's convenience can be improved.

According to the first exemplary embodiment, the authentication session ID is set as a value of Cookie "LOGIN". However, as described above, only whether Cookie "LOGIN" is within the expiration time is determined and Cookie "LOGIN" itself is not verified. Thus, the value other than the authentication session ID may be set as the value of Cookie "LOGIN". As illustrated in FIG. 9, {!$Api.Session_ID} means that the authentication session ID of the authenticated user of the service providing server B 550 is acquired from the session management module (not illustrated) of the service providing server B 550.

As illustrated in FIG. 9, {!$Api.Server_URL} means that the service providing server A 500 acquires the URL for accessing the service providing server B 550. As illustrated in FIG. 9, {!Opportunity.Id} means that a record ID of the business meeting record displayed on the screen is acquired. When the user presses the button set as illustrated in FIG. 9, JavaScript (registered trademark) is performed on the browser of the client PC 200. Another window is displayed on the browser of the client PC 200, and the client PC 200 is re-directed to access "http://service_a/unprotected/service", which is the unprotected resource. As a URL parameter for accessing, a parameter "AUTH_ID" includes the authentication session ID issued by the service providing server A 500 based on the group authentication information, a parameter "sessionid" includes the session ID of the authenticated user of the service providing server B 550, a parameter "serverurl" includes a URL parameter for accessing the service providing server B 550, and a parameter "recordid" includes a record ID of the business meeting record.

Figure 11:
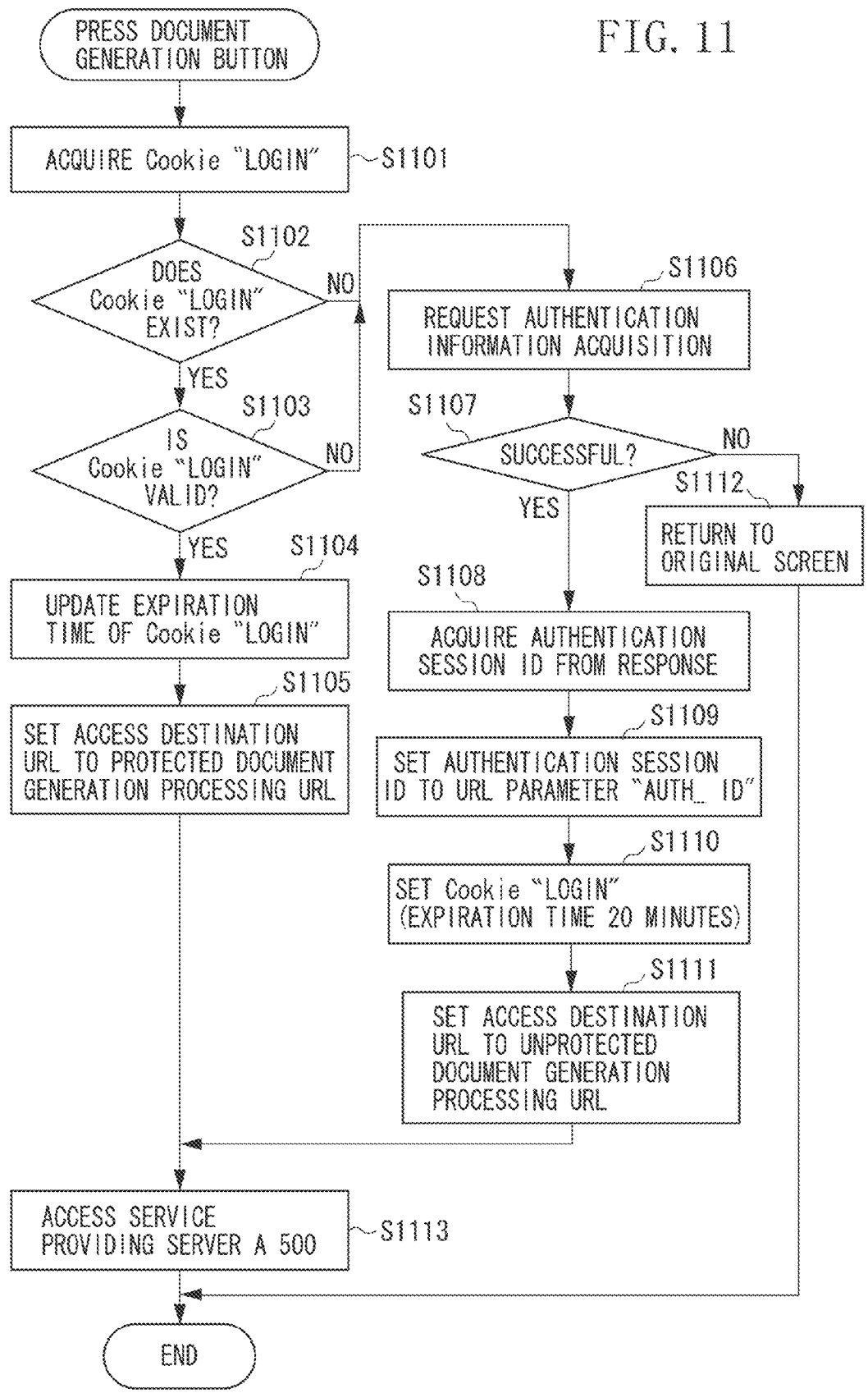
FIG. 11 is a flowchart illustrating a flow executed by a browser of a client PC according to the first exemplary embodiment of the present invention.

FIG. 11 illustrates a flow executed by the browser of the client PC 200 according to the first exemplary embodiment. This flow starts when it is detected that the user presses the button 602 for generating the document on the screen 601 for the operation data displayed on the browser of the client PC 200, and is executed when the browser performs JavaScript (registered trademark).

In step S1101, the browser of the client PC 200 acquires Cookie "LOGIN" from the HDD 211 thereof. In step S1102, the browser of the client PC 200 determines whether Cookie "LOGIN" exists, in other words, has been acquired. When Cookie "LOGIN" exists (YES in step S1102), the processing proceeds to step S1103, and when Cookie "LOGIN" does not exist (NO in step S1102), the processing proceeds to step S1106.

When Cookie "LOGIN" exists in step S1102, then instep S1103, the browser of the client PC 200 determines whether Cookie "LOGIN" is within the expiration time. When Cookie "LOGIN" is within the expiration time (YES in S1103), the processing proceeds to step S1104, and when Cookie "LOGIN" is not within the expiration time (NO in S1103), the processing proceeds to step S1106.

When it is determined that Cookie "LOGIN" is within the expiration time in step S1103, then in step S1104, the browser of the client PC 200 updates the expiration time of Cookie "LOGIN". In step S1105, the browser of the client PC 200 sets the URL used to access "http://service_a/service", which is the protected resource, and then in step S1113, the browser thereof accesses the service providing server A 500. By updating the expiration time of Cookie "LOGIN", the number of times to execute the flow for issuing new Cookie "AUTH_SESSION_ID" can be reduced.

When Cookie "LOGIN" does not exist (NO in step S1102), or when Cookie "LOGIN" is not within the expiration time (NO in step S1103), then in step S1106, the browser of the client PC 200 requests the service providing server B 550 to acquire the authentication session ID. In step S1107, the browser of the client PC200 determines whether the authentication session ID has been successfully acquired. When the authentication session ID has been successfully acquired (YES in step S1107), the processing proceeds to step S1108, and when the error is returned (NO in step S1107), the processing proceeds to step S1112. The determination in step S1107 can be performed based on the response from the service providing server B 550.

When the authentication session ID has been successfully acquired in step S1107, then in step S1108, the browser of the client PC 200 retrieves the acquired authentication session ID. In step S1109, the acquired authentication session ID is set to the URL parameter "AUTH_ID". Subsequently, the acquired authentication session ID is stored in Cookie "LOGIN". At this point, the expiration time of Cookie "LOGIN" is set to 20 minutes. The expiration time of Cookie "LOGIN" does not need to be 20 minutes as long as it is shorter than the expiration time (30 minutes) of the authentication session ID managed by the authentication server A 400. However, the shorter the expiration time is, the more the processing in step S1106 is likely to be performed. Subsequently, in step S1108, the browser of the client PC 200 sets the URL used to access "http://service_a/unprotected/service", which is the unprotected resource, and then in step S1113, the browser of the client PC 200 accesses the service providing server A 500.

When the error is returned in step S1107, then in step S1112, the screen is re-loaded. When the error is returned, the session of the authenticated user by the service providing server B 550 may expire, for example. Alternatively, the service providing server B 550 may have failed to acquire the authentication session ID. In such cases, by re-loading the screen, the authentication screen is displayed again on the browser of the client PC 200, and after the user is successfully authenticated, the screen can return to the screen that has been displayed right before. In step S1112, the error screen may be displayed without re-loading the screen. As described above, the flow executed by the browser of the client PC 200 ends.

Figure 7:
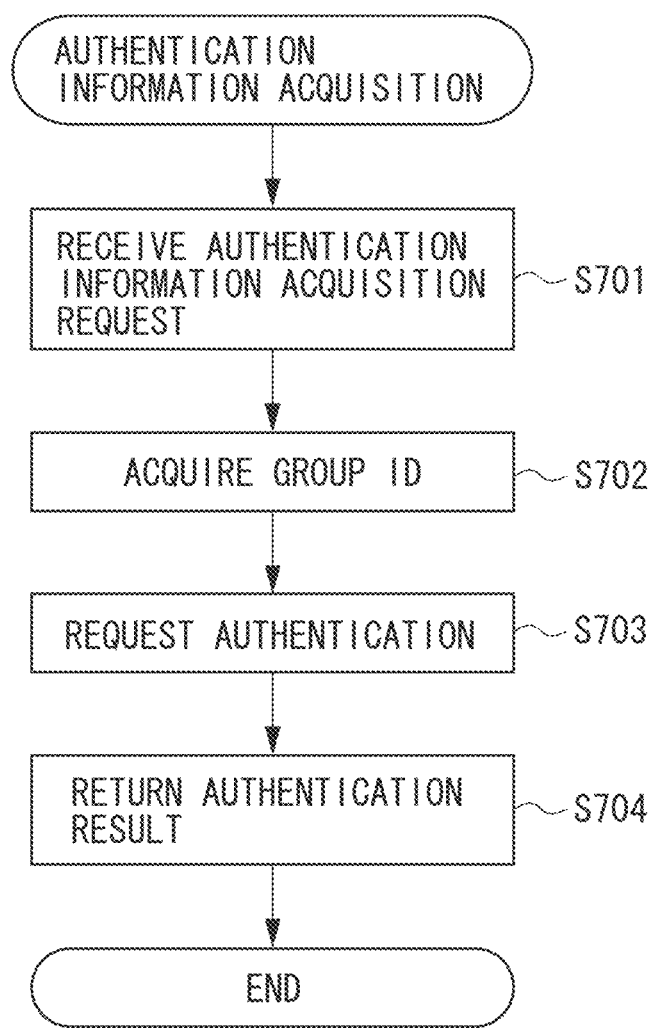
FIG. 7 is a flowchart illustrating a flow executed by the service providing server B according to the first exemplary embodiment of the present invention.

FIG. 7 illustrates the flow executed by the service providing server B 550 according to the first exemplary embodiment. In step S1106, this flow starts when the browser of the client PC 200 requests the service providing server B 550 to acquire the authentication session ID.

In step S701, the service providing server B 550 receives the authentication session ID acquisition request. In step S702, the authentication information acquisition module 5532 or 5542 acquires the group ID and password from the group ID management module 5531 or 5541. In step S703, to request the authentication with the acquired group ID and password, the authentication information acquisition module 5532 or 5542 sets the acquired group ID and password to the URL parameter, and accesses the URL "http://service_a/unprotected/login", which is the unprotected resource. In step S704, the authentication information acquisition module 5532 or 5542 returns the authentication session ID included in the authentication result as a response. The flow is performed as described above, and ends here.

Figure 8:
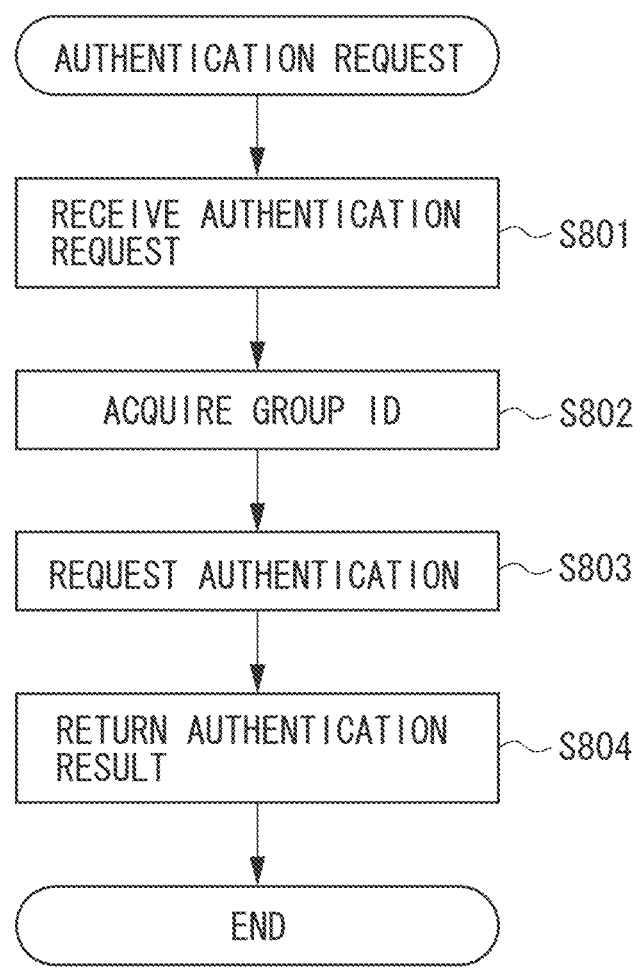
FIG. 8 is a flowchart illustrating a flow executed by the service providing server A according to the first exemplary embodiment of the present invention.

FIG. 8 illustrates a flow executed by the service providing server A 500 according to the first exemplary embodiment. In step S703 illustrated in FIG. 7, this flow starts when the service providing server B 550 accesses the service providing server A 500.

In step S801, the service providing server A 500 receives the authentication request. In step S802, the access denial module 501 acquires the group ID and password from the parameter. In step S803, the authentication information acquisition module 506 specifies the acquired group ID and password, invokes the user authentication API of the authentication server A 400, and then acquires the authentication session ID. In step S805, the authentication information acquisition module 506 returns the acquired authentication session ID to the client PC 200 as the response. The flow is performed as described above, and ends here. The expiration time (idling time) of the acquired authentication session ID is 30 minutes.

Figure 10:
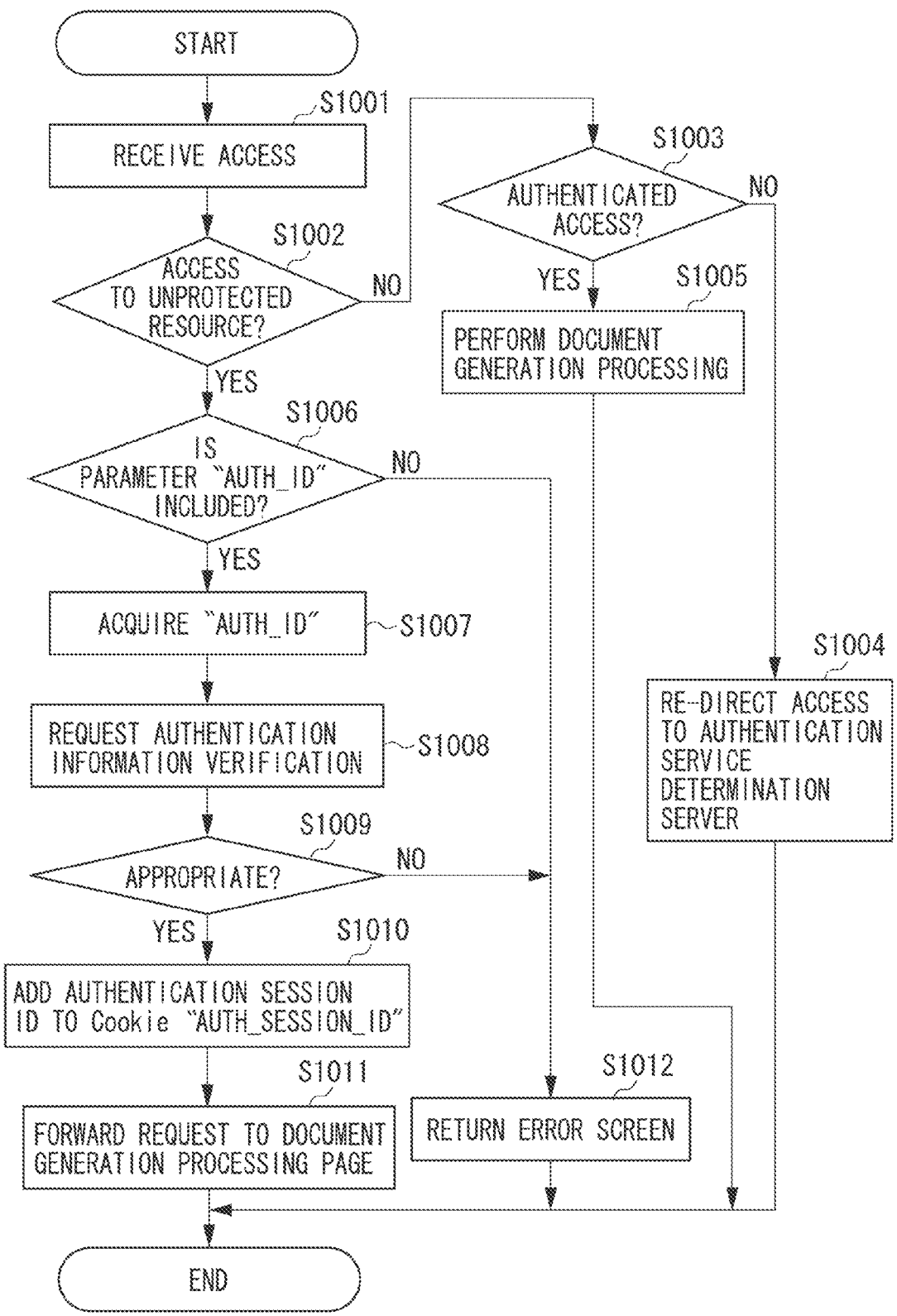
FIG. 10 is a flowchart illustrating a flow executed by the service providing server A according to the first exemplary embodiment of the present invention.

FIG. 10 illustrates a flow executed by the service providing server A 500 according to the first exemplary embodiment. This flow starts when step S1113 is performed. Alternatively, the flow starts even with the normal access of the client PC 200.

In step S1001, the service providing server A 500 receives the access of the client PC 200. In step S1002, the access denial module 501 determines whether the URL of an access destination from the client PC 200 is the unprotected resource. When the URL accessed is not the unprotected resource (NO in step S1002), the processing proceeds to step S1003, and when it is the unprotected resource (YES in step S1002), the processing proceeds to step S1006.

In step S1003, the access denial module 501 determines whether the access has been authenticated. When the access has been authenticated (YES in step S1003), the processing proceeds to step S1005, and when it has not been authenticated (NO in step S1003), the processing proceeds to step S1004.

In step S1006, the access denial module 501 determines whether the URL parameter includes the parameter "AUTH_ID". When the parameter "AUTH_ID" is included (YES in step S1006), the processing proceeds to step S1007. When it is not included (NO in step S1006), then in step S1012, the page generation module 504 returns the error screen, and then the flow ends.

In step S1007, the authentication information verification module 507 acquires the authentication session ID from the URL parameter "AUTH_ID". In step S1008, the authentication information verification module 507 specifies the acquired authentication session ID, invokes the authentication session adequateness verification API of the authentication server A 400, and then verifies whether the authentication session ID is adequate. In step S1009, the authentication information verification module 507 acquires the verification result of the authentication session adequateness verification API, and verifies whether the result is adequate. When the acquired authentication session ID is adequate (YES in step S1009), the processing proceeds to step S1010. When it is not adequate (NO in step S1009), then in step S1012, the page generation module 504 returns the error screen, and then the flow ends.

In step S1010, the authentication information addition module 508 adds the acquired authentication session ID to Cookie "AUTH_SESSION_ID". In step S1011, the page generation module 504 forwards the request to the document generation processing URL "http://service_a/service", which is the protected resource. In other words, the service providing server A 500 instructs the client PC 200 to access the protected resource. With this arrangement, the flow illustrated in FIG. 10 is performed again, and since the authentication has been performed, the processing proceeds to step S1005. As a result, the user operating the client PC 200 can receive the service without being authenticated by the service providing server A 500. In step S1011, the response may be returned to the browser of the client PC 200 and the browser of the client PC 200 may access the document generation processing URL "http://service_a/service".

In step S1005, the data acquisition module 502 acquires "recordid" from the parameter, and performs a query for acquiring the operation data on the service providing server B 550. In response to the query for acquiring the operation data, the service providing server B 550 transmits the operation data to the service providing server A 500. Subsequently, the document generation module 503 acquires the form managed by the form management module (not illustrated) to generate the document data based on the acquired operation data and form. The document generation processing in step S1005 is known, and thus will not be described. The page generation module 504 generates the response page for notifying that the document data has been generated and displaying the document data, and then returns the response page to the client PC 200. As a result, the user operating the client PC 200 can receive the service. Once the response page is received, the browser of the client PC 200 acquires Cookie "AUTH_SESSION_ID" from the response page, and stores it in the HDD 211 of the client PC 200. Subsequently, when the browser of the client PC 200 accesses the service providing server A 500, it retrieves Cookie "AUTH_SESSION_ID" from the HDD 211 and adds Cookie "AUTH_SESSION_ID" into the request.

According to the first exemplary embodiment, authentication is performed with one account (e.g., group authentication information) from the service providing server B 550 to the service providing server A 500, and the browser of the client PC 200 accesses the unprotected resource of the service providing server A 500 with the acquired authentication session ID (the authentication screen is not displayed). Further, the acquired authentication session ID is stored in Cookie of the browser and, while Cookie is valid, the client PC 200 accesses the protected resource of the service providing server A 500. Since the authentication is always valid (the authentication session ID is always valid) while Cookie is valid, the authentication screen is not displayed. As described above, the service providing server A 500 can be used with one account of the service providing server A 500 regardless of the number of user accounts of the service providing server B 550, and thus the SSO can be performed without displaying the authentication screen although the user mapping is not performed.

When the document is generated according to the present exemplary embodiment, it can be also controlled not to transmit the document to the service always requiring the identification of the user.

Subsequently, a second exemplary embodiment of the present invention will be described. Components similar to those of the first exemplary embodiment will not be described, and only a difference will be described below. According to the second exemplary embodiment, an example where a command for accessing the protected resource is not set for the button 602 will be described. Script description for the button 602 can be reduced. Further, even when the client PC 200 always accesses the unprotected resource, by saving the verification on Cookie "Auth_ID", a verification process of the authentication session ID by the authentication server A 400 can be reduced.

Figure 12:
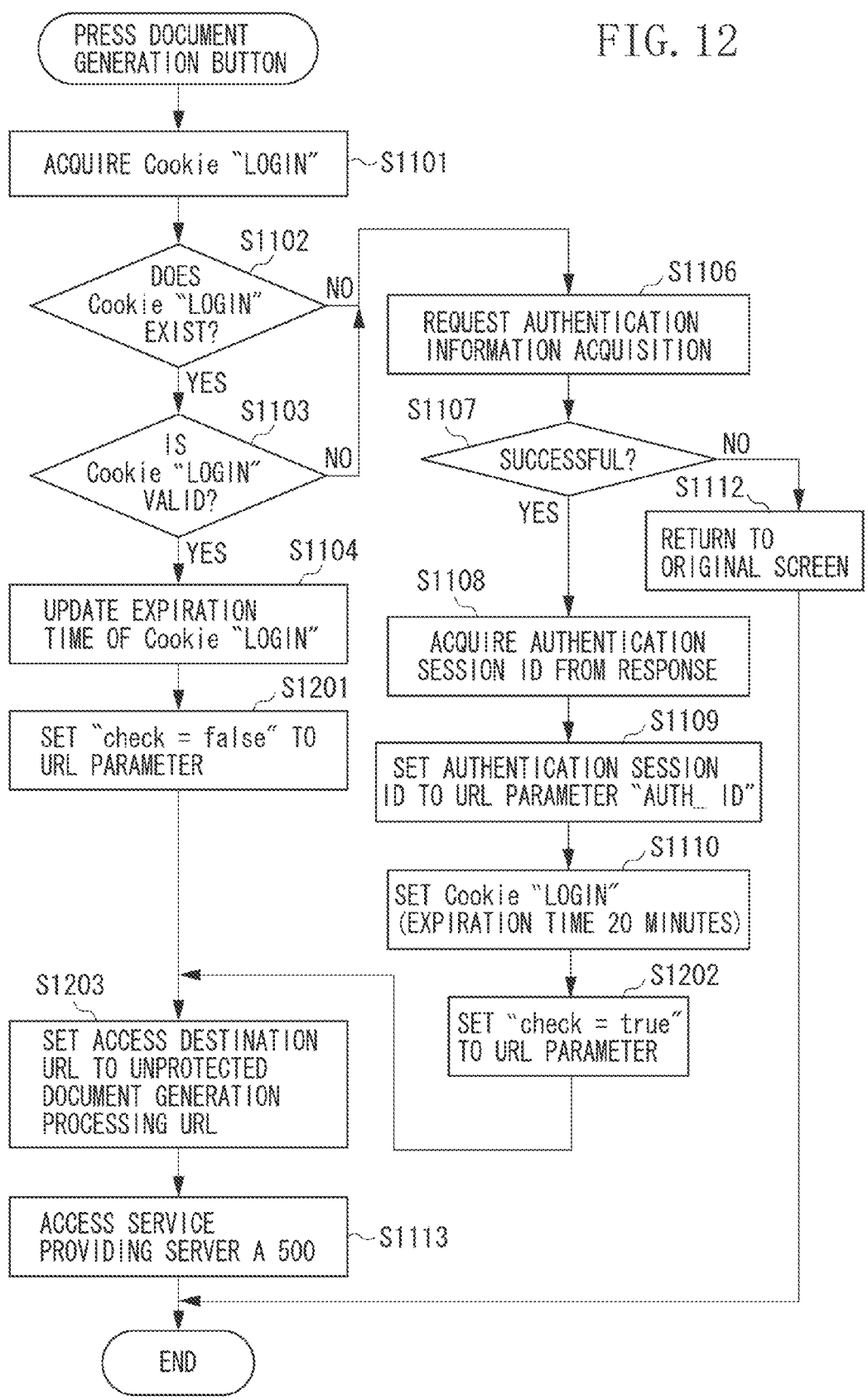
FIG. 12 is a flowchart illustrating a flow executed by a browser of a client PC according to a second exemplary embodiment of the present invention.

FIG. 12 illustrates a flow executed by the browser of the client PC 200 according to the second exemplary embodiment. In the flow similar to that in FIG. 11, the same numeral references are given, and only a difference will be described below. In step S1103, when it is determined that Cookie "LOGIN" is within the expiration time (YES in step S1103), then in step S1104, the browser of the client PC 200 updates the expiration time of Cookie "LOGIN". Further, in step S1201, the browser of the client PC 200 sets "false" for a parameter "check", and then sets the parameter "check" for the URL parameter.

When the authentication session ID is successfully acquired (YES in step S1107), the browser of the client PC 200 performs steps S1108, S1109, and S1110. Further, in step S1202, the browser of the client PC 200 sets "true" for the parameter "check", and then sets the parameter "check" for the URL parameter. When step S1201 or S1202 is performed, the browser of the client PC 200 sets "http://service_a/unprotected/service", which is the unprotected resource, for the URL to be accessed in step S1203. In step S1113, the browser of the client PC 200 accesses the service providing server A 500.

Figure 13:
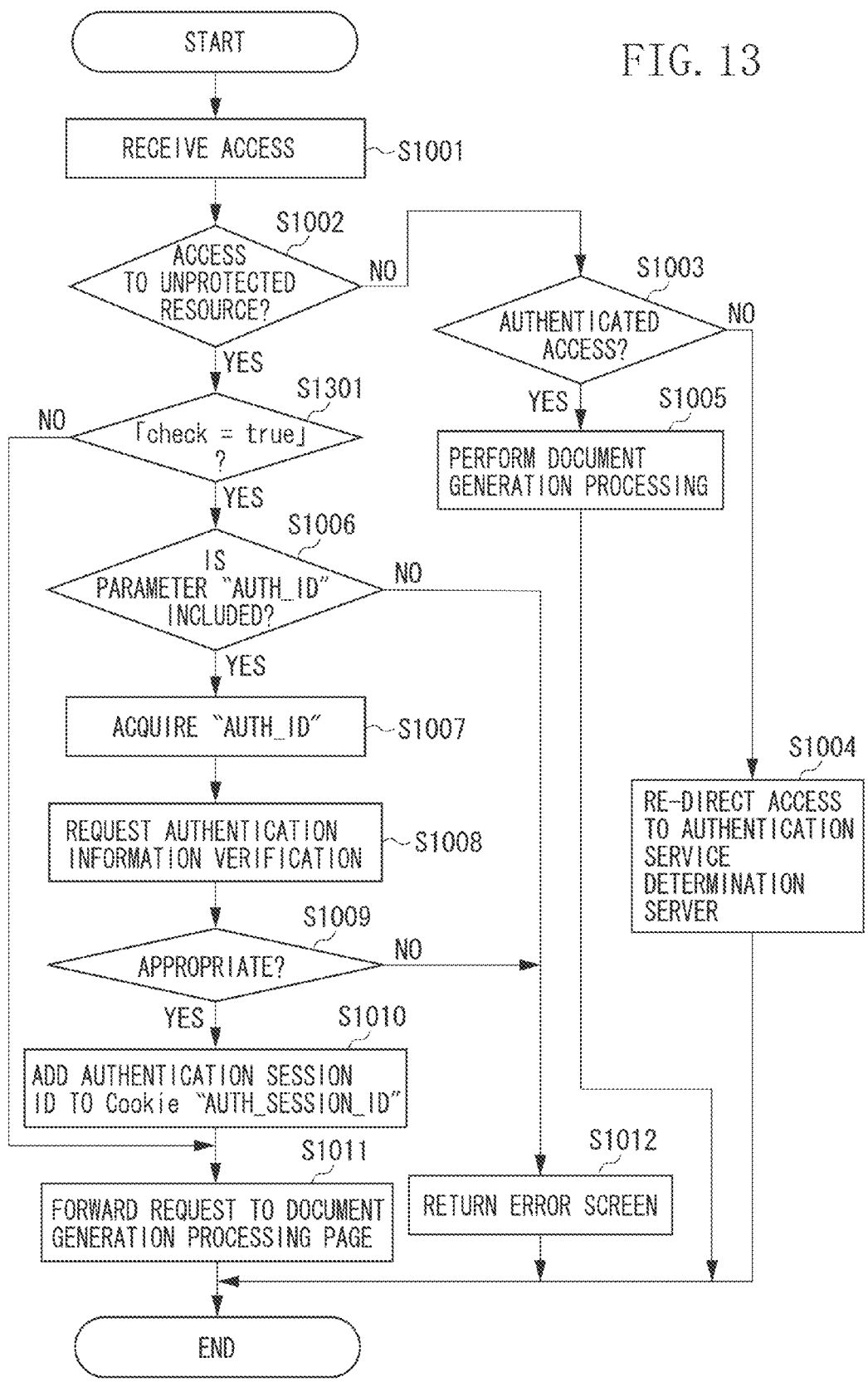
FIG. 13 is a flowchart illustrating a flow executed by a service providing server A according to the second exemplary embodiment of the present invention.

FIG. 13 illustrates a flow executed by the service providing server A 500 according to the second exemplary embodiment. In the flow similar to that in FIG. 10, the same numeral references are given, and only a difference will be described below. In step S1002, the access denial module 501 determines whether the URL accessed is the unprotected resource. When the URL accessed is the unprotected resource (YES in step S1002), then in step S1301, the access denial module 501 determines whether the "true" is set for the parameter "check" of the URL parameter. When the "true" is set (YES in step S1301), the processing proceeds to step S1006, and when it is not set (NO in step S1301), the processing proceeds to step S1011. As a result, even when the client PC 200 accesses the unprotected resource, the authentication server A 400 can reduce the verification process of the authentication session ID.

According to the first or second exemplary embodiment, the example where the service providing server A 500 is accessed with the group authentication information shared among a plurality of users in the tenant is described. Since the group ID does not specify the user, of another service providing server A 500 cooperating with the service providing server B 550, the service always requiring the identification of the user may not be able to be used. In such a case, the cooperation system having the flow of the only first or second exemplary embodiment does not specifically describe the cooperation with the service providing server that provides the service of this type. A third exemplary embodiment of the present invention will describe a specific method for realizing the cooperation system for performing the SSO according to the first or second exemplary embodiment when the service requiring the identification of the user is not used, and performing the SSO by the SAML with which the user mapping is performed when the service requiring the identification of the user is used.

FIG. 14 illustrates an example of the button setting according to the third exemplary embodiment. The button set as illustrated in FIG. 14 is used when the SSO by the SAML with which the user mapping is performed is performed. In the flow similar to that in FIG. 9, the same numeral references are given, and only a difference will be described below. This button setting defines the content 1403 of JavaScript (registered trademark) to be performed. When the button set as illustrated in FIG. 14 is pressed, JavaScript (registered trademark) is performed on the browser of the client PC 200, and another window is displayed to access "http://service_a/service", which is the protected resource. The URL parameter for the access includes a company ID. The company ID is used to identify the tenant of the service providing server A 500. As described above, the cooperation of the SSO by the SAML with which the user mapping is performed is performed as described above.

At least one of buttons illustrated in FIGS. 9 and 14 is disposed on the screen 601 for the operation data of the service providing server B 550. When two buttons are disposed on the screen 601, for example, the button having the button setting illustrated in FIG. 14 may be disposed at an immediate right of the button 602. When the service requiring user's identification is not used, the SSO is performed according to the first or second exemplary embodiment using the button 602. When the service requiring the user's identification is used, using the button corresponding to the button setting illustrated in FIG. 14, the SSO by the SAML with which the user mapping is performed is performed.

The service that does not require the user's identification according to the third exemplary embodiment includes the document generation service described in the first and second exemplary embodiments. The document generation service does not require a management as to who has generated the document. Further, the service requiring the identification of the user includes a printing service for generating print data based on the generated document data and causing a printer to print the print data. Since the print data is actually printed by the printer, costs need to be managed. Thus, since the user needs to be identified, which user has used the printing service is managed.

According to the third exemplary embodiment, the button is appropriately used depending on the service to be used, and when the service requiring the user's identification is used, the SSO by the SMAL with which the user mapping is performed can be performed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiments, group authentication information is set for a group to which a plurality of users belongs, and the SSO is realized using the group authentication information, so that the user's work of the user mapping can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-122910 filed May 30, 2012, which is hereby incorporated by reference herein in its entirety.

What is claimed is:

1. A cooperation system including a first information processing system for managing user authentication information about a plurality of users for each group and a second information processing system for acquiring data from the first information processing system and providing a service using the acquired data, the first information processing system comprising:
first one or more processors; and
one or more computer-readable media storing first instructions that, when executed by the first one or more processors, cause the first one or more processors to perform operations comprising:
receiving user authentication information from a client and authenticating a user based on the received user authentication information;
providing a screen to be displayed on the client, the screen including a button for receiving a request for starting to use the service provided by the second information processing system and a button for receiving a request for starting to use another service provided by the second information processing system, wherein the service does not require user authentication using the user authentication information and the another service does require user authentication using the user authentication information;
identifying, in response to reception of a request for starting to use the service after the user is successfully authenticated, group authentication information allocated to a group to which a plurality of users belong, the plurality of users including the user authenticated based on the user authentication information, wherein the group authentication information is common to all the users belonging to the group; and
transmitting, to the second information processing system, the group authentication information and an authentication request, wherein the authentication request comprises a request to perform the requested authentication using the group authentication information and return identification information indicating whether the authentication was successful, and the second information processing system comprising:
second one or more processors; and
one or more computer-readable media storing second instructions that, when executed by the second one or more processors, cause the second one or more processors to perform operations comprising:
receiving the transmitted group authentication information and performing the requested authentication based on the received group authentication information;
acquiring, after the authentication has been successfully performed based on the group authentication information, the identification information indicating that the authentication was successful, wherein the identification information comprises information associated with a session of the user; and
transmitting, to the first information processing system, the identification information,
wherein the first instructions, when executed by the first one or more processors, cause the first one or more processors to perform operations further comprising:
transmitting, to the client, the transmitted identification information and an instruction for the client to access the second information processing system, and
wherein the second instructions, when executed by the second one or more processors, cause the second one or more processors to perform operations further comprising:
verifying the identification information transmitted from the client performing access according to the instruction; and
providing, in response to successful verification of the identification information, the service to the user operating the client without authenticating the user operating the client.

2. A first information processing system for managing user authentication information about a plurality of users for each group, the first information processing system comprising:
one or more hardware processors; and
one or more computer-readable media storing instructions that, when executed by the one or more hardware processors, cause the one or more hardware processors to perform operations comprising:
receiving user authentication information from a client and authenticating a user based on the received user authentication information;
providing a screen to be displayed on the client, the screen including a button for receiving a request for starting to use a service provided by a second information processing system and a button for receiving a request for starting to use another service provided by the second information processing system, wherein the service does not require user authentication using the user authentication information and the another service does require user authentication using the user authentication information;
identifying, in response to reception of a request for starting to use the service after the user is successfully authenticated, group authentication information allocated to a group to which a plurality of users belong, the plurality of users including the user authenticated based on the user authentication information, wherein the group authentication information is common to all the users belonging to the group;
transmitting, to the second information processing system, the group authentication information and an authentication request, wherein the authentication request comprises a request to perform the requested authentication using the group authentication information and return identification information indicating whether the authentication was successful;

receiving, from the second information processing system, the identification information indicating that the authentication was successful based on the group authentication information, wherein the identification information comprises information associated with a session of the user;

transmitting the received identification information to the client; and transmitting data to the second information processing system for requesting the data without authenticating the user operating the client in response to access from the client that has received the identification information.

3. The first information processing system according to claim 2, wherein the screen further includes an item for displaying data input by a user via the client, and wherein the service comprises a service provided by the second information processing system using the data.

4. The first information processing system according to claim 2, wherein transmitting the identification information to the client comprises transmitting to the client the identification information in which the expiration time is set and an instruction for storing the identification information.

5. The first information processing system according to claim 3, the operations further comprising receiving, from the client, after receiving the request for starting to use the service provided by the second information processing system using the data, the identification information in which the expiration time is set, and if the received identification information is within the expiration time, instructing the client to access the second information processing system, and if the acquired identification information is not within the expiration time, transmitting the group authentication information to the second information processing system, receiving new identification information, and transmitting the received new identification information to the client.

6. A cooperation method for a cooperation system including a first information processing system for managing user authentication information about a plurality of users for each group and a second information processing system for acquiring data from the first information processing system and providing a service using the acquired data, the cooperation method comprising:

receiving, via the first information processing system, user authentication information from a client and authenticating a user based on the received user authentication information;

providing a screen to be displayed on the client, the screen including a button for receiving a request for starting to use the service provided by the second information processing system and a button for receiving a request for starting to use another service provided by the second information processing system, wherein the service does not require user authentication using the user authentication information and the another service does require user authentication using the user authentication information;

identifying, in response to reception of a request for starting to use the service after the user has been successfully authenticated, group authentication information allocated to a group to which a plurality of users belong, the plurality of users including the user authenticated based on the user authentication information, wherein the group authentication information is common to all the users belonging to the group;

transmitting, via the first information processing system to the second information processing system, the group authentication information and an authentication request, wherein the authentication request comprises a request to perform the requested authentication using the group authentication information and return identification information indicating whether the authentication was successful;

receiving, via the second information processing system, the transmitted group authentication information and performing the requested authentication based on the received group authentication information;

acquiring, via the second information processing system, after the authentication has been successfully performed based on the group authentication information, the identification information indicating that the authentication was successful, wherein the identification information comprises information associated with a session of the user;

transmitting, via the second information processing system to the first information processing system, the identification information;

transmitting, via the first information processing system to the client, the transmitted identification information and an instruction for the client to access the second information processing system;

verifying, via the second information processing system, the identification information transmitted from the client accessed according to the instruction; and providing, via the second information processing system, in response to successful verification of the identification information, the service to the user operating the client without authenticating the user operating the client.

* * * * *